US012743890B2

(12) United States Patent
Schroeter et al.

(10) Patent No.: US 12,743,890 B2
(45) Date of Patent: Sep. 22, 2026

(54) SYSTEMS AND METHODS TO DETECT DROPLET PRESENCE ON VEHICLE WINDSHIELD

(71) Applicant: Ford Global Technologies, LLC, Dearborn, MI (US)

(72) Inventors: Robert Schroeter, Livonia, MI (US); Mahmoud Yousef Ghannam, Canton, MI (US); Justin Miller, Berkley, MI (US)

( * ) Notice: Subject to any disclaimer, the term of this patent is extended or adjusted under 35 U.S.C. 154(b) by 309 days.

(21) Appl. No.: 18/328,936

(22) Filed: Jun. 5, 2023

(65) Prior Publication Data

US 2024/0404292 A1 Dec. 5, 2024

(51) Int. Cl.

| | |
|---|---|
| ***G06V 20/56*** | (2022.01) |
| ***B60S 1/04*** | (2006.01) |
| ***G06V 10/28*** | (2022.01) |
| *G06V 10/82* | (2022.01) |

(52) U.S. Cl.

CPC ............ *G06V 20/56* (2022.01); *B60S 1/0452* (2013.01); *G06V 10/28* (2022.01); *G06V 10/82* (2022.01)

(58) Field of Classification Search

CPC ..... B60S 1/0452; B60S 1/0844; G06V 10/28; G06V 10/82; G06V 20/56

See application file for complete search history.

(56) References Cited

U.S. PATENT DOCUMENTS 6,233,364 B1 * 5/2001 Krainiouk ................. G06T 5/20 382/254
11,594,017 B1 2/2023 Gupta et al.
2007/0115357 A1 * 5/2007 Stein ..................... B60S 1/0844 348/148
2011/0074955 A1 * 3/2011 Kuehnle ................. G01W 1/14 382/104

(Continued)

FOREIGN PATENT DOCUMENTS

CN 112699719 A 4/2021
DE 102021115232 A1 12/2022

OTHER PUBLICATIONS

Hamzeh Y, Rawashdeh SA. A Review of Detection and Removal of Raindrops in Automotive Vision Systems. J Imaging. Mar. 10, 2021;7(3):52. doi: 10.3390/jimaging7030052. PMID: 34460708; PMCID: PMC8321291. (Year: 2021).*

(Continued)

*Primary Examiner* — Michael J Vanchy, Jr.
(74) *Attorney, Agent, or Firm* — Frank Lollo; Eversheds Sutherland (US) LLP

(57) ABSTRACT

A vehicle having a windshield and a camera is disclosed. The camera may be configured to capture a first image of a vehicle surrounding area through the windshield. The vehicle may further include an image processing module configured to determine a plurality of gradients associated with a plurality of pixels in the first image and an unfocused object present in the first image based on the plurality of gradients. The image processing module may be further (Continued)

configured to generate a binary image using the first image responsive to determining the unfocused object. The vehicle may further include a processor configured to determine a droplet presence on the windshield based on the binary image and perform a predefined action responsive to determining droplet presence on the windshield.

12 Claims, 5 Drawing Sheets

(56) References Cited

U.S. PATENT DOCUMENTS

2013/0044910 A1* 2/2013 Cord .................... G06T 7/0002
382/100
2023/0077516 A1* 3/2023 Bianconcini ........... G06V 20/56
382/104

OTHER PUBLICATIONS

Yu-Tang Huang, et al., Deep-Learning Rain Detection and Wiper Control Featuring Gaussian Extraction, 2020 International Conference on Technologies and Applications of Artificial Intelligence (TAAI), IEEE, Dec. 2020, pp. 153-158.
Florin Bogdan Marin et al., Real-Time Raindrop Detection Based on Deep Learning Algorithm, Research Gate, Dec. 2020, pp. 1-5.
Malavika Nadathur Venugopal, an AI Based Raindrop Detection System for Autonomous Driving, EDAG, Nov. 26, 2021, pp. 1-4.
Chi-Cheng Lai et al., Video-Based Windshield Rain Detection and Wiper Control Using Holistic-View Deep Learning, 2019 IEEE 15th International Conference on Automation Science and Engineering, Aug. 2019, pp. 1060-1065.

* cited by examiner

100

SYSTEMS AND METHODS TO DETECT DROPLET PRESENCE ON VEHICLE WINDSHIELD

FIELD

The present disclosure relates to systems and methods to detect droplet presence on vehicle windshield and more particularly to systems and methods to detect droplet presence on vehicle windshield based on images captured by vehicle cameras.

BACKGROUND

Vehicles typically include windshields through which vehicle drivers or occupants view surrounding areas. For example, a vehicle may include a front windshield through which a vehicle driver may view the road on which the vehicle may be travelling, and a rear windshield through which the vehicle driver may view objects in proximity to a vehicle rear side. The vehicle may additionally include wipers that may clean the windshields when rainwater, snow, etc., may be present on the windshields.

Modern vehicles additionally include dedicated rain sensors or rain sensing modules that detect presence of rainwater on the windshields. The rain sensors facilitate the vehicles in controlling wiper movement on the windshields. For example, the rain sensors may facilitate the vehicles in automatically activating and controlling wiper speed when the rain sensors detect rainwater presence on the windshields.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
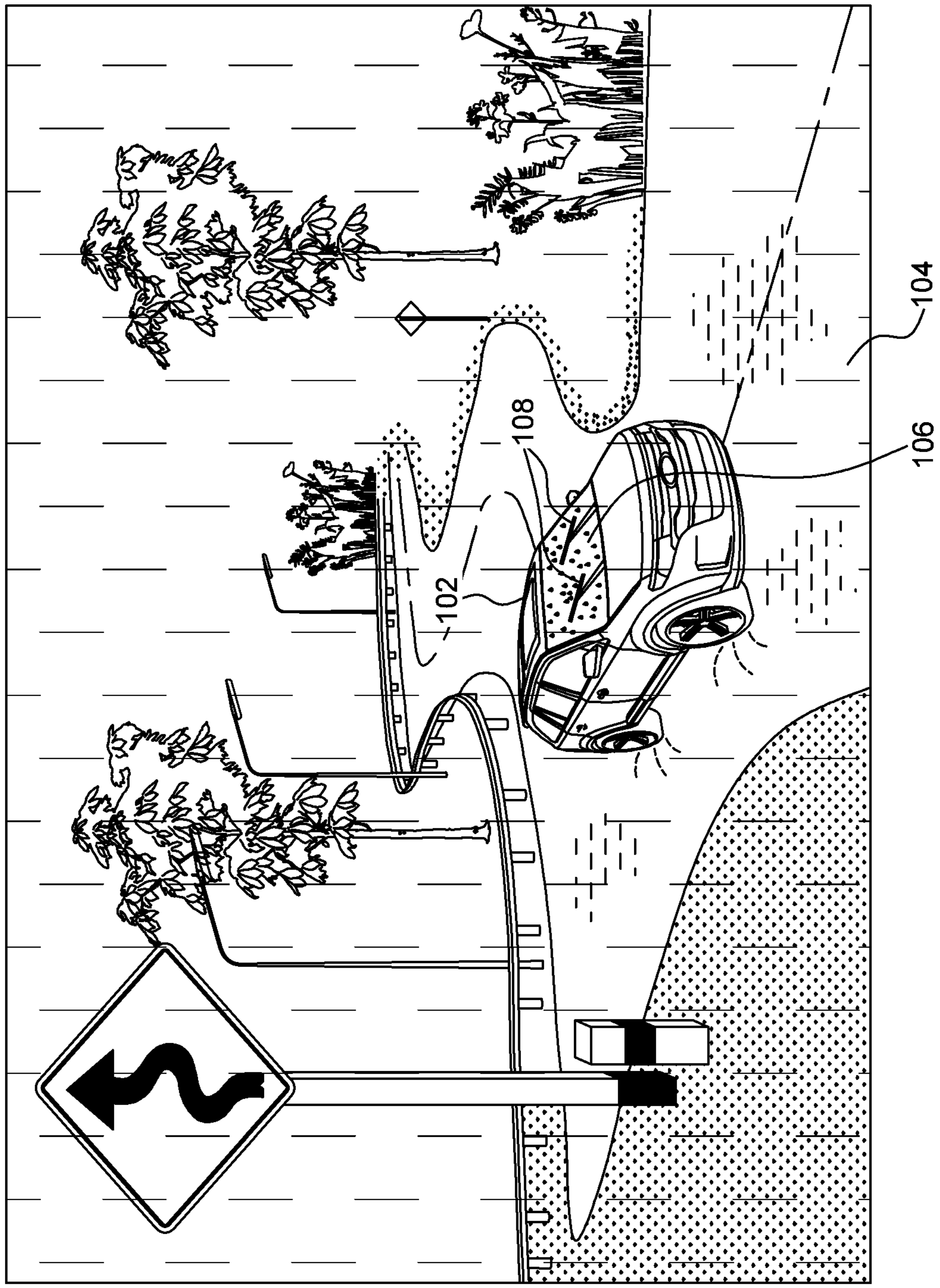
FIG. 1 depicts an example environment in which techniques and structures for providing the systems and methods disclosed herein may be implemented.

The present disclosure describes system and method to detect droplet presence on a vehicle windshield based on images captured by one or more vehicle cameras. The system may obtain a first image from a front vehicle camera that may be configured to capture images of surrounding areas in front of a vehicle through a windshield glass. The first image may be, for example, a Red-Green-Blue (RGB) image, a grayscale image, a color space image, a thermal image, and/or the like. The system may determine a plurality of gradients associated with a plurality of pixels in the first image. Responsive to determining the plurality of gradients, the system may determine one or more unfocused image portions or unfocused objects present in the first image. Responsive to determining the unfocused objects, the system may convert the first image to a binary image, such that the unfocused objects may be accentuated in the binary image. The system may further execute Artificial Intelligence (AI)/Machine Learning (ML) based algorithms to analyze the binary image and determine droplet presence or absence on the windshield. The system may further determine a count of droplets on the windshield, responsive to determining droplet presence.

In some aspects, the system may include a wiper control module configured to control movement of vehicle wipers. The system may activate wiper movement responsive to determining droplet presence on the windshield. The system may further control wiper speed based on the determined count of droplets.

In further aspects, the system may be configured to obtain inputs from additional vehicle cameras, sensors and/or external servers. The additional vehicle cameras may include, for example, a rear camera, side mirror cameras, and/or the like. The addition sensors may include, for example, a microphone, Global Position System (GPS) receivers, and/or the like. The system may use the inputs obtained from the additional cameras, sensors and/or the external servers to predict rainfall presence in proximity to the vehicle. The system may determine droplet presence on the windshield when the system predicts that rainfall may be present in proximity to the vehicle. In some aspects, the system may use inputs obtained from the additional cameras, sensors and/or the external servers to determine droplet presence when the front vehicle camera may not be enabled to capture images through the windshield glass.

The present disclosure discloses system and method to detect droplet presence on a vehicle windshield. The system uses images obtained from vehicle cameras to detect droplet presence on the vehicle windshield and control wiper movement, and may hence not require conventional rain sensing modules to control wiper movement. The system uses AI/ML based algorithms to detect droplet presence on the vehicle windshield, thus enhancing accuracy of droplet presence prediction.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle such as, for example, a car, a work vehicle, a crossover vehicle, a truck, a van, a minivan, a taxi, a bus, etc. The vehicle 102 may be a manually driven vehicle, and/or may be configured to operate in a partially autonomous mode, and may include any powertrain such as, for example, a gasoline engine, one or more electrically-actuated motor(s), a hybrid system, etc. The vehicle 102 may be travelling on a road 104 during rainfall, snowfall, hailstorm, thunderstorm, etc., as shown in FIG. 1.

The vehicle 102 may include a front windshield 106 and a rear windshield (not shown) that may be made of laminated glass, or any other similar transparent material. The front windshield 106 and the rear windshield may be wet due to rain, as shown in FIG. 1. Specifically, the front windshield 106 and the rear windshield may have presence of one or more water droplets on them. The vehicle 102 may further include front wipers 108 (or wipers 108) that may be configured to clean the front windshield 106, and rear wipers (not shown) that may be configured to clean the rear windshield.

The vehicle 102 may further include one or more vehicle cameras and sensors (described in detail below in conjunction with FIGS. 2 and 3) that may be configured to capture images, sound signals, and/or determine ambient environmental conditions in vehicle vicinity. The vehicle 102 may be configured to obtain images from vehicle cameras and detect droplet presence on the front windshield 106 (and the rear windshield) based on the obtained images. For example, the vehicle 102 may obtain one or more first images captured from a vehicle dash camera (shown as dash camera 302 in FIG. 3) that may be configured to capture images of a surrounding area in front of the vehicle 102 through the front windshield 106 (specifically, through front windshield glass). The first images may be, for example, Red-Green-Blue (RGB) images, grayscale images, color space images, thermal images, and/or the like. Throughout the description below, the first images are referred to as RGB images, however other image types described above are within the present disclosure scope. Usage of RGB images should not be construed as limiting the present disclosure scope.

Responsive to obtaining the RGB images from the vehicle dash camera, the vehicle 102 may convert the RGB images into binary images to accentuate droplets in the binary images. The vehicle 102 may then detect droplet presence on the front windshield 106 (and the rear windshield) by analyzing the binary images. The process of converting an RGB image into a binary image and detecting droplet presence on the front windshield 106 based on the binary image is described in detail below in conjunction with FIG. 2.

In some aspects, the vehicle 102 may analyze the binary image and detect droplet presence by using one or more Artificial Intelligence (AI)/Machine Learning (ML) based algorithms, for example, bagged and boosted decision tree based algorithm, deep learning algorithms, convolutional neural network (CNN) based algorithms, YOLO (You Only Look Once) algorithm, and/or the like.

Responsive to detecting presence of one or more droplets on the front windshield 106, the vehicle 102 may activate the wipers 108 to clean the front windshield 106. In some aspects, the vehicle 102 may additionally determine a count of droplets on the front windshield 106 based on binary image analysis. The vehicle 102 may control wiper speed based on the determined count of droplets.

In additional aspects, the vehicle 102 may determine droplet presence on the front windshield 106 by obtaining inputs from additional vehicle cameras and sensors. In some aspects, the vehicle 102 may determine droplet presence based on inputs from the additional vehicle cameras and sensors when the vehicle dash camera may not be enabled to capture surrounding area images via the front windshield glass. In other aspects, the vehicle 102 may determine droplet presence based on inputs from the additional vehicle cameras and sensors even when the vehicle dash camera may be enabled to capture surrounding area images via the front windshield glass. In the latter case, the vehicle 102 may determine droplet presence based on inputs from the additional vehicle cameras and sensors to augment or enhance confidence level of droplet presence detection based on the analysis of the binary image (that may be generated by converting the RGB image obtained from the vehicle dash camera).

Examples of additional vehicle cameras and sensors may include, but are not limited to, a front vehicle camera, a rear vehicle camera, a right side vehicle mirror camera, a left side vehicle mirror camera, an environmental condition detection sensor, and/or the like. As an example, the vehicle 102 may detect droplet presence on the front windshield 106 when images from the front and rear vehicle cameras indicate overcast weather condition or rainfall, even when the vehicle dash camera may not be enabled to capture surrounding area images via the front windshield glass.

Further details of the process of detecting droplet presence on the front windshield 106 are described below in conjunction with FIG. 2.

The vehicle 102 and/or a vehicle operator implement and/or perform operations, as described here in the present disclosure, in accordance with the owner manual and safety guidelines.

Figure 2:
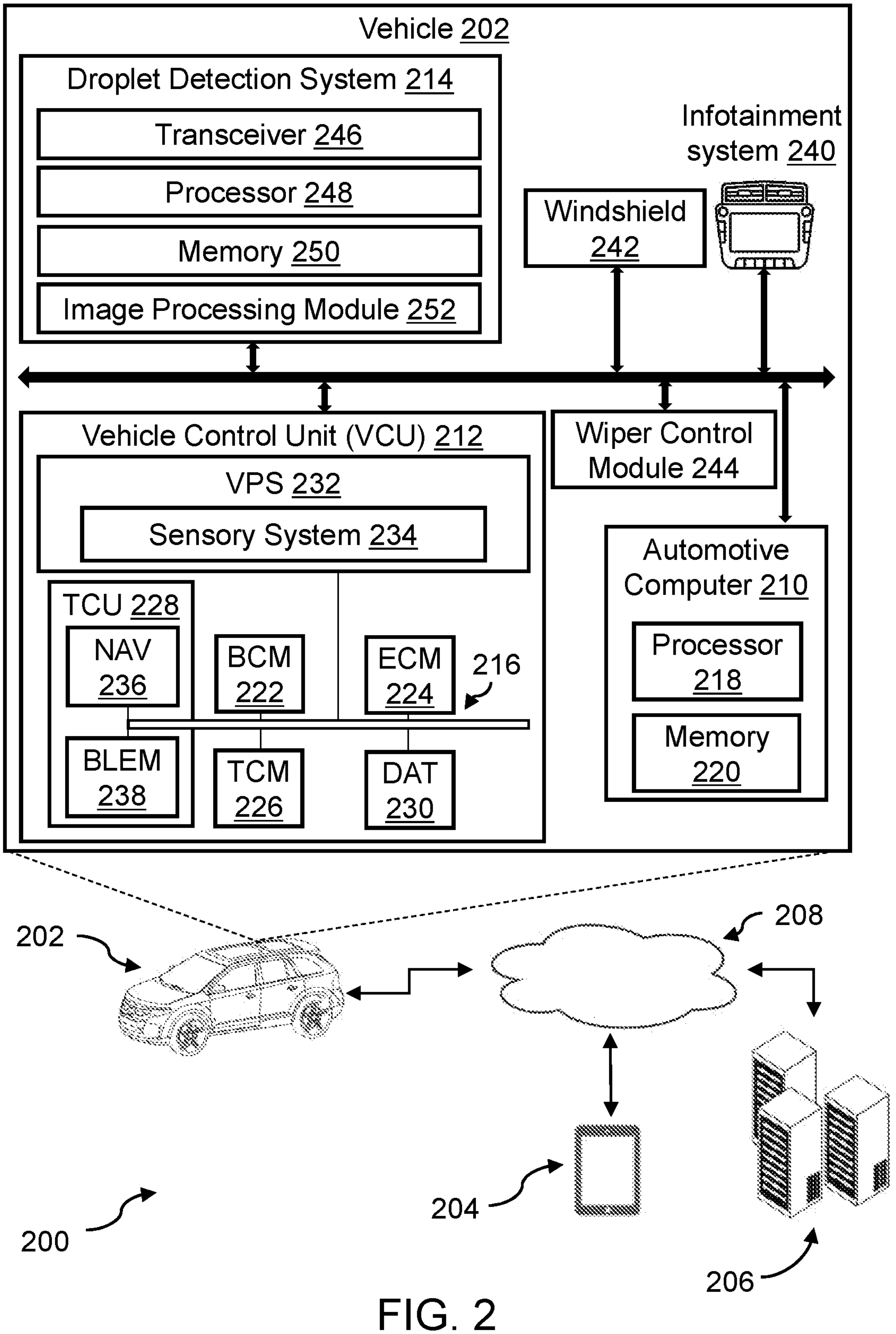
FIG. 2 depicts a block diagram of an example system to detect droplet presence on a windshield in accordance with the present disclosure.

FIG. 2 depicts a block diagram of an example system 200 to detect droplet presence on a windshield in accordance with the present disclosure. While describing FIG. 2, references may be made to FIGS. 3, 4A and 4B.

The system 200 may include a vehicle 202, a user device 204, and one or more servers 206 communicatively coupled with each other via one or more networks 208. The vehicle 202 may be same as the vehicle 102 described in conjunction with FIG. 1. The user device 204 may be associated with a vehicle operator (not shown), and may include, but is not limited to, a mobile phone, a laptop, a computer, a tablet, a wearable device, or any other similar device with communication capabilities. The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In further aspects, the server(s) 206 may provide real-time weather condition information to the vehicle 202 and other vehicles operating as part of the vehicle fleet. The weather condition information may include information associated with presence, absence and/or level of rain or snow, ambient temperature, and/or the like in a geographical area where the vehicle 202 may be located. In additional aspects, the server(s) 206 may store and provide AI/ML based algorithms to the vehicle 202 that may facilitate the vehicle 202 to detect droplet presence on a vehicle windshield by analyzing images captured by vehicle cameras.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a droplet detection system 214. The VCU 212 may include a plurality of Electronic Control Units (ECUs) 216 disposed in communication with the automotive computer 210.

The user device 204 may connect with the automotive computer 210 and/or the droplet detection system 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the droplet detection system 214 may be installed in a vehicle engine compartment (or elsewhere in the vehicle 202), in accordance with the disclosure. Further, the automotive computer 210 may operate as a functional part of the droplet detection system 214. The automotive computer 210 may be or include an electronic vehicle controller, having one or more processor(s) 218 and a memory 220. Moreover, the droplet detection system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable memory storing a droplet detection program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle 202 systems, connected servers (e.g., the server(s) 206), and other vehicles (not shown in FIG. 2) operating as part of a vehicle fleet. The VCU 212 can include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, ambient weather sensors, vehicle wheel sensors, vehicle internal and external cameras, etc. An example snapshot/top view of the vehicle 202 with the one or more sensors described here is shown in FIG. 3.

Figure 3:
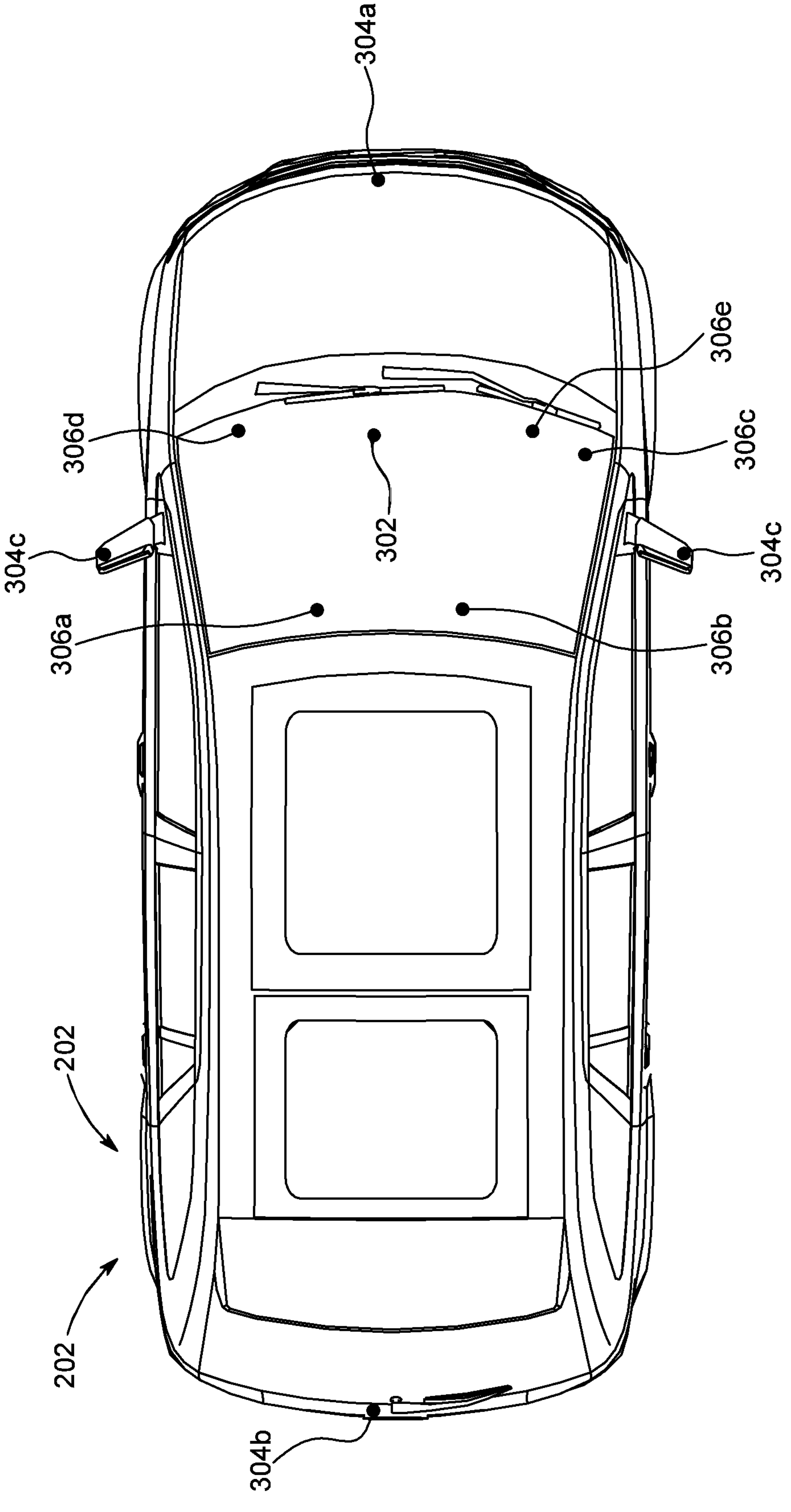
FIG. 3 depicts a snapshot of an example vehicle with a plurality of sensors in accordance with the present disclosure.

As shown in FIG. 3, the vehicle 202 may include a front dash camera 302. The front dash camera 302 may be configured to capture images of surrounding areas in front of the vehicle 202 through the front windshield glass. The vehicle 202 may include additional cameras including, but not limited to, a front camera 304*a*, a rear camera 304*b*, left and right mirror cameras 304*c*, a rear dash camera (not shown), and/or the like (collectively referred to as additional cameras 306). The vehicle 202 may include additional cameras that are not depicted in FIG. 3, for example, door pillar cameras. The exemplary depiction of additional cameras shown in FIG. 3 should not be construed as limiting, and the vehicle 202 may include more additional cameras (which are not shown), without departing from the present disclosure scope. The vehicle 202 may further include additional sensors including, but not limited to, a built-in microphone 306*a*, an external microphone 306*b*, an external rain sensor 306*c*, a built-in GPS sensor/receiver 306*d*, an external GPS sensor/receiver 306*e*, and/or the like (collectively referred to as additional sensors 306).

In some aspects, the VCU 212 may control vehicle operational aspects and implement one or more instruction sets received from the user device 204, from one or more instruction sets stored in the memory 220, including instructions operational as part of the droplet detection system 214.

The TCU 228 may be configured and/or programmed to provide vehicle connectivity to wireless computing systems onboard and off board the vehicle 202, and may include a Navigation (NAV) receiver 236 (which may be same as GPS sensors/receivers 306*d*, 306*e*) for receiving and processing a GPS signal, a BLE® Module (BLEM) 238, a Wi-Fi transceiver, a UWB transceiver, and/or other wireless transceivers (not shown in FIG. 2) that may be configurable for wireless communication between the vehicle 202 and other systems (e.g., a vehicle key fob, not shown in FIG. 2), computers, and modules. The TCU 228 may be disposed in communication with the ECUs 216 by way of a bus.

The ECUs 216 may control aspects of vehicle operation and communication using inputs from human drivers, inputs from an autonomous vehicle controller, the droplet detection system 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, the wipers 108, door locks and access control, and various comfort controls. The BCM 222 may also operate as a gateway for bus and network interfaces to interact with remote ECUs (not shown in FIG. 2).

The DAT controller 230 may provide Level-1 through Level-3 automated driving and driver assistance functionality that can include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 210 may connect with an infotainment system 240. The infotainment system 240 may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications, navigation maps, etc. on the touchscreen interface portion.

The vehicle 202 may further include a windshield 242 and a wiper control module 244. The windshield 242 may be same as the front windshield 106 and/or the rear windshield, and the wiper control module 244 may be part of the BCM 222 or may be separate from the BCM 222 (as shown in FIG. 2). The wiper control module 244 may control operation of the wipers 108 responsive to obtaining commands signals or instructions from the automotive computer 210 and/or the droplet detection system 214.

The computing system architecture of the automotive computer 210, the VCU 212, and/or the droplet detection system 214 may omit certain computing modules. It should be readily understood that the computing environment depicted in FIG. 2 is an example of a possible implementation according to the present disclosure, and thus, it should not be considered limiting or exclusive.

In accordance with some aspects, the droplet detection system 214 may be integrated with and/or executed as part of the ECUs 216. The droplet detection system 214, regardless of whether it is integrated with the automotive computer 210 or the ECUs 216, or whether it operates as an independent computing system in the vehicle 202, may include a transceiver 246, a processor 248, a computer-readable memory 250, and an image processing module 252.

The transceiver 246 may be configured to receive information/inputs from one or more external devices or systems, e.g., the user device 204, the server(s) 206, and/or the like via the network 208. For example, the transceiver 246 may receive AI/ML based algorithms for droplet detection and/or weather condition information of a geo-location where the vehicle 202 may be located from the server(s) 206. As another example, the transceiver 246 may receive inputs or weather condition information from the user device 204. Further, the transceiver 246 may transmit notifications (e.g., alert/alarm signals) to the external devices or systems. In addition, the transceiver 246 may be configured to receive information/inputs from vehicle 202 components such as the infotainment system 240, the vehicle sensory system 234 (including the cameras and sensors depicted in FIG. 3), and/or the like. Further, the transceiver 246 may transmit notifications (e.g., alert/alarm signals) to the vehicle 202 components such as the infotainment system 240, the BCM 222, etc.

The processor 248 and the memory 250 may be same as or similar to the processor 218 and the memory 220, respectively. In some aspects, the processor 248 may be an AI/ML based processor that may utilize the memory 250 to store programs (e.g., AI/ML based algorithms obtained from the server(s) 206) in code and/or to store data for performing aspects in accordance with the disclosure. The memory 250 may be a non-transitory computer-readable memory storing the droplet detection code. In some aspects, the memory 250 may additionally store information associated with the vehicle 202 and one or more sensory inputs received from the vehicle sensory system 234 (e.g., the cameras and sensors depicted in FIG. 3).

As described above, the processor 248 may be AI/ML based processor that may utilize the AL/ML based algorithms stored in the memory 250 to perform one or more tasks. For example, the processor 248 may use ML based algorithms to detect droplet presence in a binary image. The concept of binary image is described later in the description below. Examples of ML based algorithms include, but are not limited to, bagged and boosted decision tree based algorithms, deep learning based algorithms, and/or the like.

A person ordinarily skilled in the art may appreciate that machine learning (ML) is an application of the AI using which the processor 248 may have the ability to automatically learn and enhance from experience without being explicitly programmed. Machine learning focuses on use of data and algorithms to imitate the way humans learn. In some aspects, the machine learning algorithms may be created to make classifications and/or predictions (e.g., prediction of droplet presence on the windshield 242 based on a binary image).

Machine learning may be of various types based on data or signals available to the learning system. For example, the machine learning approach may include supervised learning, unsupervised learning, semi-supervised learning, or reinforcement learning. The supervised learning is an approach that may be supervised by a human. In this approach, the machine learning algorithm may use labeled training data and defined variables. In the case of supervised learning, both the input and the output of the algorithm may be specified/defined, and the algorithms may be trained to classify data and/or predict outcomes accurately.

Broadly, the supervised learning may be of two types, "regression" and "classification". In classification learning, the learning algorithm may help in dividing the dataset into classes based on different parameters. In this case, a computer program may be trained on the training dataset and based on the training, the computer program may categorize input data into different classes. Some known methods used in classification learning include Logistic Regression, K-Nearest Neighbors, Support Vector Machines (SVM), Kernel SVM, Naïve Bayes, Decision Tree Classification, and Random Forest Classification.

In regression learning, the learning algorithm may predict output value that may be of continuous nature or real value. Some known methods used in regression learning include Simple Linear Regression, Multiple Linear Regression, Polynomial Regression, Support Vector Regression, Decision Tree Regression, and Random Forest Regression.

The unsupervised learning is an approach that involves algorithms that may be trained on unlabeled data. An unsupervised learning algorithm may analyze the data by its own and find patterns in input data. Further, semi-supervised learning is a combination of supervised learning and unsupervised learning. A semi-supervised learning algorithm involves labeled training data; however, the semi-supervised learning algorithm may still find patterns in the input data. Reinforcement learning is a multi-step or dynamic process. This model is similar to supervised learning but may not be trained using sample data. This model may learn "as it goes" by using trial and error. A sequence of successful outcomes may be reinforced to develop the best recommendation or policy for a given problem in reinforcement learning.

In an exemplary aspect, the processor 248 may use supervised machine learning technique to detect droplet presence on the windshield 242. Specifically, the processor 248 may obtain a training/label data from the server(s) 206, using which the processor 248 may detect droplet presence or absence (as "classifications") on the windshield 242 based on the binary image obtained by the processor 248.

In further aspects, the processor 248 may detect droplet presence and/or location in the binary image by using a neural network model (not shown) that may be stored in the memory 250 and/or obtained from the server(s) 206. The neural network model may be a trained or unsupervised neural network model that may analyze the obtained binary image using machine learning, which may enable the processor 248 to detect droplet presence in the binary image.

In one or more aspects, the neural network model may include electronic data, which may be implemented, for example, as a software component, and may rely on code databases, libraries, scripts, or other logic or instructions for execution of a neural network algorithm by the processor 248. The neural network model may be implemented as code and routines configured to enable a computing device, such as the processor 248, to perform one or more operations (such as detecting droplet presence and/or location in a binary image). In some aspects, the neural network model may be implemented using hardware including a processor, a microprocessor (e.g., to determine droplet presence), a field-programmable gate array (FPGA), or an application-specific integrated circuit (ASIC). In other aspects, the neural network model may be implemented by using a combination of hardware and software.

Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some aspects, the neural network model may include numerical computation techniques using data flow graphs. In one or more aspects, the neural network model may be based on a hybrid architecture of multiple Deep Neural Networks (DNNs).

The image processing module 252 may be configured to process an RGB image (e.g., an RGB image obtained from the front dash camera 302) and convert the RGB image into a binary image to accentuate unfocused image portions in the RGB image or unfocused objects present in the RGB image, as described below.

In operation, the image processing module 252 may obtain an RGB image of a surrounding area in front of the vehicle 202 from the front dash camera 302. As described above, the front dash camera 302 may be configured to capture the RGB image through the windshield glass. An example RGB image 402 captured by the front dash camera 302 and obtained by the image processing module 252 is shown in FIG. 4A.

Figure 4A:
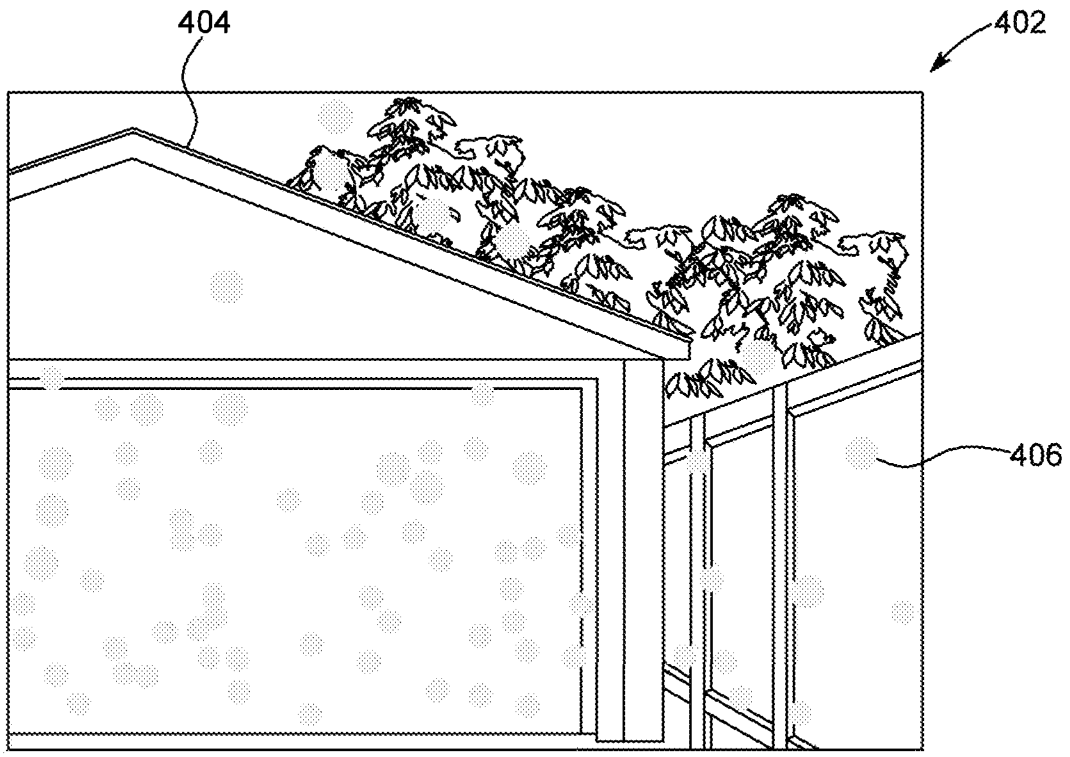
FIG. 4A depicts a snapshot of an example RGB image in accordance with the present disclosure.

As shown in FIG. 4A, the RGB image 402 may include one or more focused objects 404 (or objects 404) that may be present in front of the vehicle 202. Examples of the focused objects 404 may include a house, a door, a tree, etc. (as shown in FIG. 4A). The RGB image 402 may further include one or more unfocused objects 406 (or objects 406), which may be, for example, water droplets on the windshield glass (e.g., caused due to rainfall).

Responsive to obtaining the RGB image 402 from the front dash camera 302, the image processing module 252 may determine a plurality of gradients associated with a plurality of pixels in the RGB image 402. A person ordinarily skilled in the art may appreciate that a "lens effect" may be caused in the RGB image 402 due to surface tension of water, when water droplets (e.g., raindrops) may be present on the windshield glass. The lens effect may result in highly localized gradients at droplet edges in the RGB image 402.

Responsive to determining the plurality of gradients, the image processing module 252 may determine or identify the objects 404 and the objects 406 in the RGB image 402. In some aspects, the objects 404 may have respective associated gradients less than a mean gradient value of the RGB image 402 (that the image processing module 252 may calculate responsive to determining the plurality of gradients). Further, the objects 406 may have respective associated gradients more than the mean gradient value of the RGB image 402. The image processing module 252 may identify the objects 406 in the RGB image 402 by determine edges of those objects (e.g., water droplets) that may have associated gradients more than the mean gradient value of the RGB image 402.

Figure 4B:
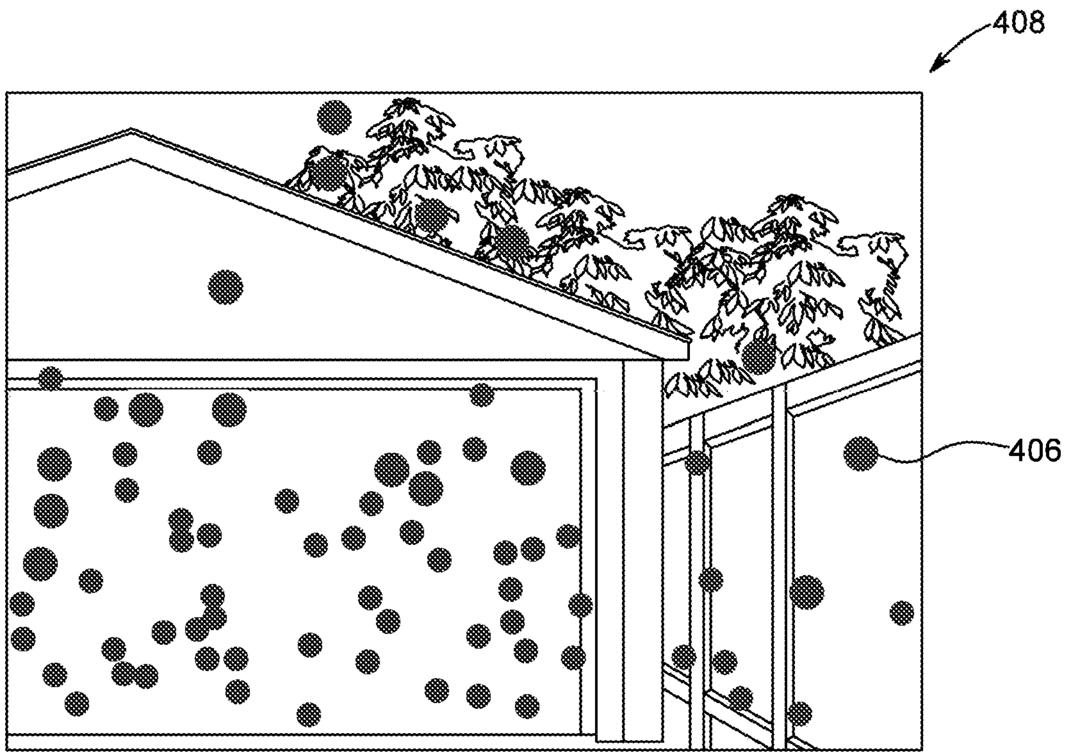
FIG. 4B depicts a snapshot of an example binary image in accordance with the present disclosure.

Responsive to identifying the objects 406, the image processing module 252 may generate a binary image 408 by using the RGB image 402. Specifically, the image processing module 252 may convert the RGB image 402 into the binary image 408, as shown in FIG. 4B. The image processing module 252 may convert the RGB image 402 into the binary image 408 such that the objects 406 may be accentuated in the binary image 408. The image processing module 252 may accentuate the objects 406 such that gradients associated with "accentuated" objects 406 may be equivalent to the mean gradient value of the RGB image 402, as depicted in the binary image 408.

The image processing module 252 may then transmit the binary image 408 to the processor 248 (and to the memory 250 for storage purpose). The processor 248 may obtain the binary image 408 from the image processing module 252 and may analyze the binary image 408 to detect droplet presence on the windshield 242 based on the analysis. Specifically, the processor 248 may obtain one or more AI/ML algorithms described above from the memory 250, and execute the instructions included in the algorithms to detect droplet presence on the windshield 242 based on the binary image 408.

In an exemplary aspect, the processor 248 may execute bagged and boosted decision tree algorithm to detect the droplet presence in the binary image 408 (and hence on the windshield 242). The processor 248 may use a training set (that may be stored in the memory 250) including a plurality of binary images with droplets and a plurality of binary images without droplets. The processor 248 may execute the bagged and boosted decision tree algorithm using the training set to classify the binary image 408 as either "having droplets" or "not having droplets". Similarly, in an alternative or additional aspect, the processor 248 may execute a deep learning algorithm and use the training set to classify the binary image 408 as either "having droplets" or "not having droplets".

In further aspects, the processor 248 may execute the neural network model described above to detect droplet presence on the windshield 242 by using the binary image 408 and detect droplet locations in the binary image 408. For example, the processor 248 may execute R-CNN and/or Yolo algorithms and use the training set to detect one or more regions in the binary image 408 having a probability greater than a threshold of having droplet presence, and then classify each object in the detected regions as either "droplet" or "no droplet". In some aspects, the processor 248 may determine/calculate a count of droplets in the binary image 408 based on the detected droplet locations.

Responsive to detecting droplet presence on the windshield 242 by using the binary image 408, the processor 248 may transmit a first command signal to the wiper control module 244. The wiper control module 244 may activate the wipers 108, when the wiper control module 244 receives the first command signal from the processor 248. In addition, responsive to determining the count of droplets in the binary image 408, the processor 248 may transmit a second command signal to the wiper control module 244. In some aspects, the second command signal may include information associated with the determined count of droplets. The wiper control module 244 may control wiper speed responsive to receiving the second command signal, based on the count of droplets in the binary image 408. For example, the wiper control module 244 may increase wiper speed if the count of droplets is greater than a first threshold count, and may decrease the wiper speed if the count of droplets is less than a second threshold count (which may be same as or different from the first threshold count).

Although the description above describes an aspect where the processor 248 detects/determines droplet presence based on the RGB image obtained from the front dash camera 302, in some aspects, the processor 248 may additionally or alternatively determine the droplet presence on the windshield 242 based on inputs obtained from the additional cameras 304 and/or the additional sensors 306. In this case, the processor 248 may obtain images from the addition cameras 304 and may use the AI/ML algorithms described above (e.g., CNN, deep learning algorithms, etc.) to predict presence or absence of rain or snow in proximity to the vehicle 202. For example, the processor 248 may determine that rainfall or snowfall may be present in proximity to the vehicle 202 when the images captured from the front camera 304*a*, the rear camera 304*b*, and/or the left and right mirror cameras 304*c* indicate presence of rainfall. In this case, the processor 248 may determine droplet presence on the windshield 242 even when the front dash camera 302 may not be enabled to capture images through the windshield glass and the images obtained from the additional cameras 304 indicate rainfall presence.

In some aspects, even when the front dash camera 302 may be enabled to capture images through the windshield glass, the processor 248 may use the images obtained from the additional cameras 304 to augment droplet presence decision-making via the binary image analysis and to increase confidence/accuracy of droplet presence prediction. Specifically, in this case, the processor 248 may correlate the determined rainfall presence in proximity to the vehicle 202 and the determined droplet presence on the windshield 242 to ascertain or determine whether to transmit the first command signal to the wiper control module 244. For example, if the processor 248 determines droplet presence on the windshield 242, however no rainfall presence in proximity to the vehicle 202 is detected, the processor 248 may not transmit the first command signal to the wiper control module 244. On the other hand, if the processor 248 determines droplet presence on the windshield 242 and rainfall presence in proximity to the vehicle 202 is also detected (indicating higher confidence or probability of rain), the processor 248 may transmit the first command signal to the wiper control module 244. In this case, the processor 248 may execute another AI algorithm and use another training data set to correlate the rainfall presence information with the droplet presence information, to ascertain or determine whether to transmit the first command signal to the wiper control module 244.

In yet another aspect, the processor 248 may obtain inputs from the additional sensors 306 and/or weather condition information from the user device 204, the server(s) 206, and/or other vehicles in a vehicle fleet (e.g., via vehicle-to-vehicle communication) to predict rainfall presence in proximity to the vehicle 202. For example, the processor 248 may determine that rainfall may be present in proximity to the vehicle 202 when sound signals obtained from the external microphone 306*b* and weather condition information obtained from the user device 204 and/or the server(s) 206 indicate rainfall presence. Similar to the aspect described above, in this case also, the processor 248 may determine droplet presence on the windshield 242 by predicting rainfall presence when the front dash camera 302 may not be enabled to capture images through the windshield glass, or to augment droplet presence decision-making via the binary image analysis.

Figure 5:
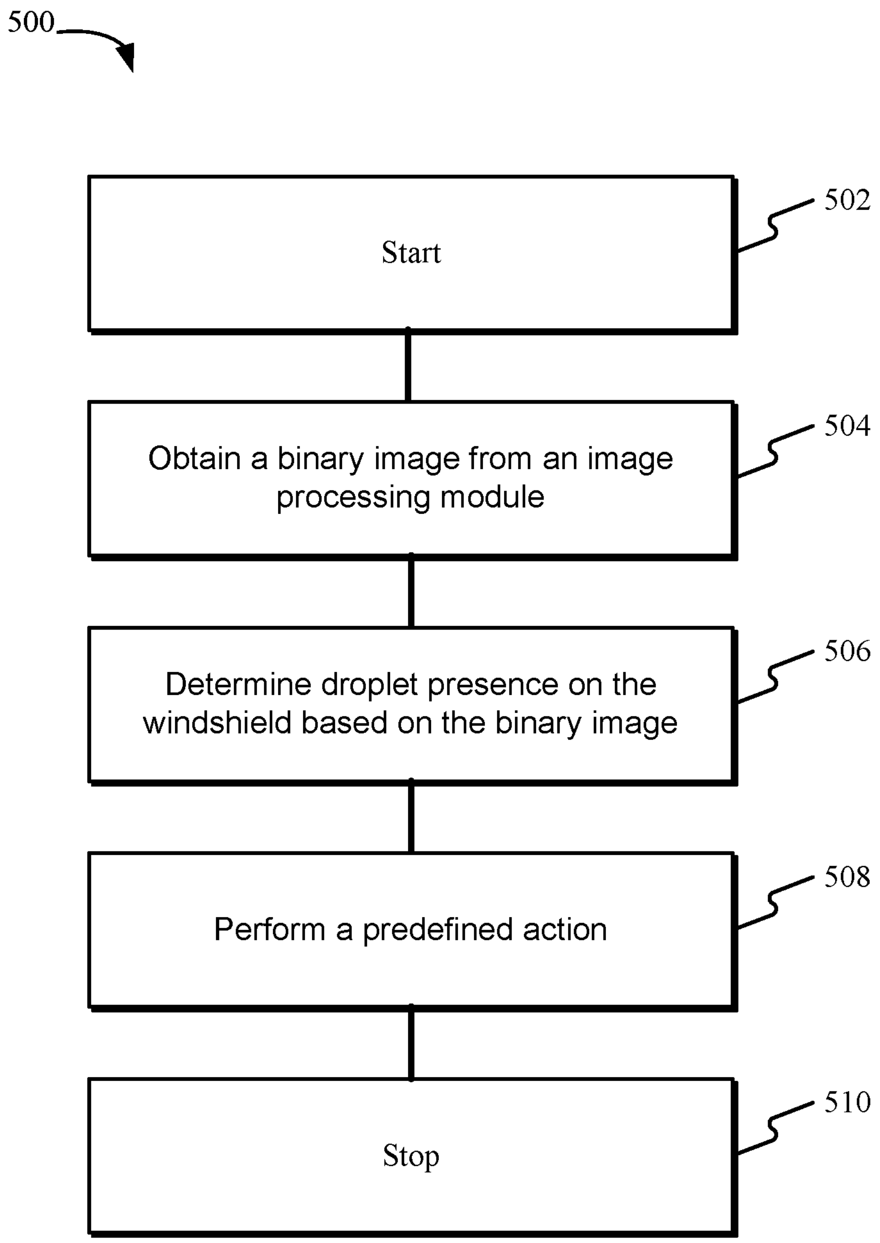
FIG. 5 depicts a flow diagram of an example method to detect droplet presence on a windshield in accordance with the present disclosure.

FIG. 5 depicts a flow diagram of an example method 500 to detect droplet presence on the windshield 242 in accordance with the present disclosure. FIG. 5 may be described with continued reference to prior figures. The following process is exemplary and not confined to the steps described hereafter. Moreover, alternative embodiments may include more or less steps that are shown or described herein and may include these steps in a different order than the order described in the following example embodiments.

The method 500 starts at step 502. At step 504, the method 500 may include obtaining, by the processor 248, the binary image 408 from the image processing module 252. As described above, the image processing module 252 may generate the binary image 408 by converting the RGB image 402 obtained from the front dash camera 302 to the binary image 408. The objects 406 may be accentuated in the binary image 408.

At step 506, the method 500 may include determining, by the processor 248, droplet presence on the windshield 242 based on the binary image 408. As described above, the processor 248 may determine droplet presence on the windshield 242 by using one or more AI/ML algorithms.

At step 508, the method 500 may include performing, by the processor 248, a predefined action based on a droplet presence determination. As an example, the processor 248 may transmit the first command signal to the wiper control module 244, responsive to determining droplet presence on the windshield 242. The wiper control module 244 may control wiper movement based on the first command signal, as described above.

The method 500 may end at step 510.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a windshield;

a vehicle camera configured to capture a first image of a vehicle surrounding area;

an image processing module configured to:

obtain the first image from the vehicle camera, wherein the first image is an RGB image and includes a first set of focused objects and a second set of unfocused objects;

determine a plurality of gradients associated with a plurality of pixels in the first image;

determine a first set of gradients, from the plurality of gradients, associated with the first set of focused objects;

determine a second set of gradients, from the plurality of gradients, associated with the second set of unfocused objects;

determine that the first set of gradients has values less than a mean gradient value of the first image;

determine that the second set of gradients has values greater than the mean gradient value of the first image; and generate a binary image using the first image, wherein the binary image accentuates the second set of unfocused objects; and a processor communicatively coupled with the image processing module, wherein the processor is configured to:

obtain the binary image from the image processing module;

determine a droplet presence on the windshield based on the binary image;

receive, from a additional sensor of the vehicle, information about presence of rainfall in the vicinity of the vehicle; and perform a predefined action based on the presence of the droplet and presence of rainfall in the vicinity of the vehicle, wherein the predefined action includes sending a signal to a wiper control module of the vehicle, wherein the vehicle camera captures the first image of the vehicle surrounding area through the windshield, and wherein the wiper control module activates wipers.

2. The vehicle of claim 1, wherein the processor is further configured to:

determine a count of droplets present on the windshield based on the binary image; and transmit a signal to a wiper control module of the vehicle, wherein the signal comprises information associated with the count of droplets.

3. The vehicle of claim 1 further comprising an additional vehicle camera.

4. The vehicle of claim 3, wherein the additional vehicle camera comprises at least one of: a right side mirror camera, a left side mirror camera, a door pillar camera, and a rear camera.

5. The vehicle of claim 3, wherein the processor is further configured to:

obtain inputs from the additional vehicle camera;

determine a rainfall presence in proximity to the vehicle based on the inputs from the additional vehicle camera;

correlate the determined rainfall presence in proximity to the vehicle with the droplet presence on the windshield; and perform the predefined action based on the correlation.

6. The vehicle of claim 1, wherein the processor determines the droplet presence on the windshield based on the binary image by using at least one of: bagged and boosted decision tree algorithm, deep learning, and convolutional neural network algorithm.

7. A method to detect a droplet presence on a vehicle windshield, the method comprising:

obtaining, by a processor, a binary image from an image processing module of a vehicle, wherein the image processing module is configured to:

obtain a first image from a vehicle camera configured to capture the first image of a vehicle surrounding area, wherein the first image is an RGB image;

identify a set of focused objects in the first image;

identify a set of unfocused objects in the first image;

determine a plurality of gradients associated with a plurality of pixels in the first image;

determine that a first set of gradients, from the plurality of gradients, associated with the set of focused objects is less than a mean gradient value of the first image;

determine that a second set of gradients, from the plurality of gradients, associated with the set of unfocused objects is greater than the mean gradient value of the first image; and generate the binary image using the first image, wherein the binary image accentuates the set of unfocused objects;

determining, by the processor, a droplet presence on the vehicle windshield based on the binary image;

receiving, from a additional sensor of the vehicle, information about presence of rainfall in a vicinity of the vehicle; and performing, by the processor, a predefined action based on a determination of the droplet presence and the presence of rainfall in the vicinity of the vehicle, wherein the predefined action includes sending a signal to a wiper control module of the vehicle, wherein the vehicle camera captures the first image of the vehicle surrounding area through the vehicle windshield, and wherein the wiper control module activates wipers.

8. The method of claim 7 further comprising:

determining a count of droplets present on the vehicle windshield based on the binary image; and transmitting a signal to a wiper control module of the vehicle, wherein the signal comprises information associated with the count of droplets.

9. The method of claim 7 further comprising:

obtaining inputs from an additional vehicle camera;

determining a rainfall presence in proximity to the vehicle based on the inputs from the additional vehicle camera;

correlating the determined rainfall presence in proximity to the vehicle with the determined droplet presence on the windshield; and performing the predefined action based on the correlation.

10. The method of claim 9, wherein the additional vehicle camera comprises at least one of: a right side mirror camera, a left side mirror camera, a door pillar camera, and a rear camera.

11. The method of claim 7, wherein determining the droplet presence on the vehicle windshield comprises determining the droplet presence by using at least one of: bagged and boosted decision tree algorithm, deep learning, and convolutional neural network algorithm.

12. A non-transitory computer-readable storage medium having instructions stored thereupon which, when executed by a processor, cause the processor to:

obtain a binary image from an image processing module of a vehicle, wherein the image processing module is configured to:

obtain a first RGB image from a vehicle camera, the first RGB image including a vehicle surrounding area;

determine a plurality of gradients associated with a plurality of pixels in the first image;

determine a set of focused objects in the first RGB image;

determine a set of unfocused objects in the first RGB image;

determine that a first set of gradients, of the plurality of gradients, associated with the focused objects is less than a mean gradient value of the first RGB image;

determine that a second set of gradients, of the plurality of gradients, associated with the unfocused objects is greater than a mean gradient value of the first RGB image; and generate the binary image using the first image, wherein the binary image accentuates the unfocused objects;

determine a droplet presence on a vehicle windshield based on the binary image;

receive, from a additional sensor of the vehicle, information about presence of rainfall in the vicinity of the vehicle; and perform a predefined action based on a determination of the droplet presence and presence of rainfall in the vicinity of the vehicle, the predefined action including sending a signal to a wiper control module of the vehicle, wherein the vehicle camera captures the first image of the vehicle surrounding area through the vehicle windshield, and wherein the wiper control module activates wipers.

* * * * *